UNITED STATES PATENT OFFICE.

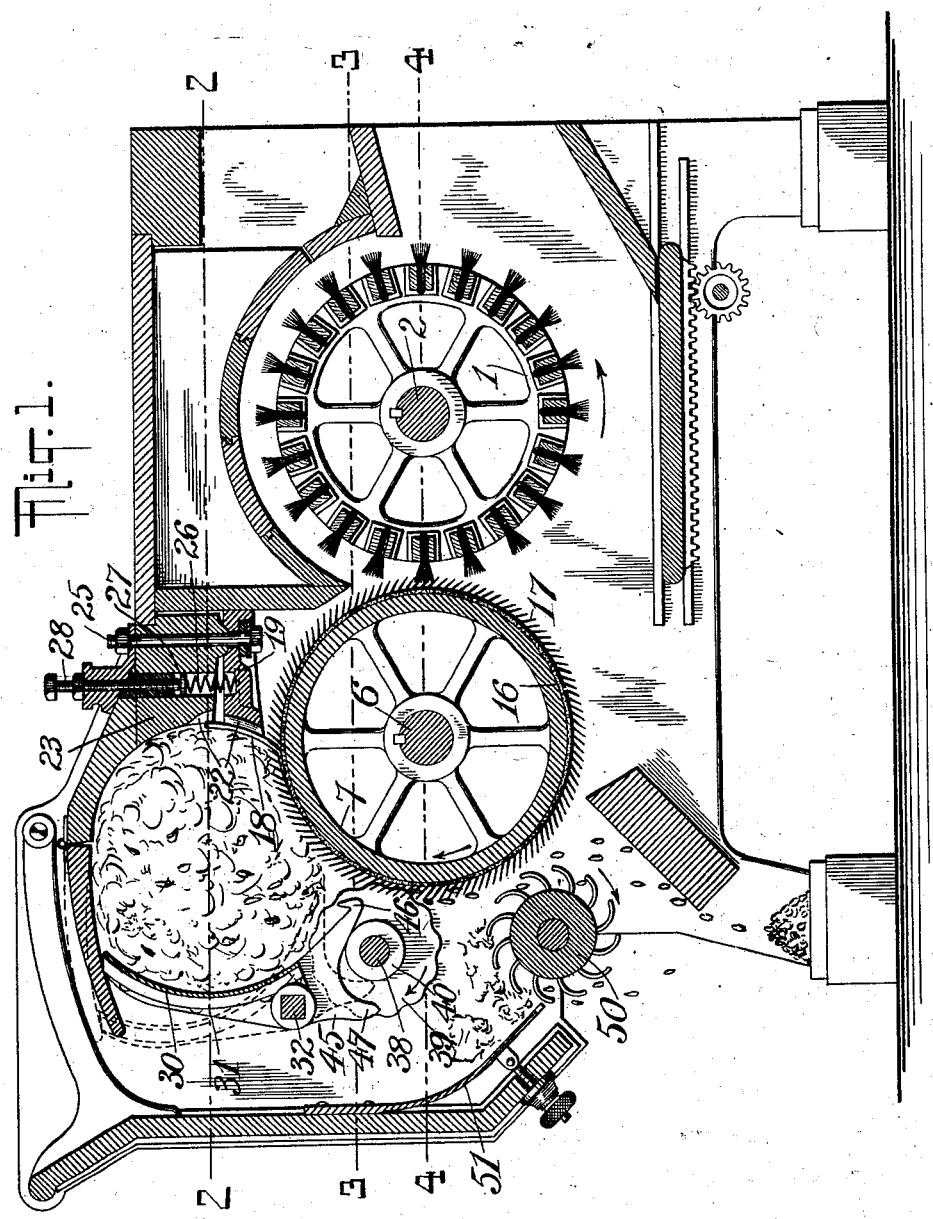

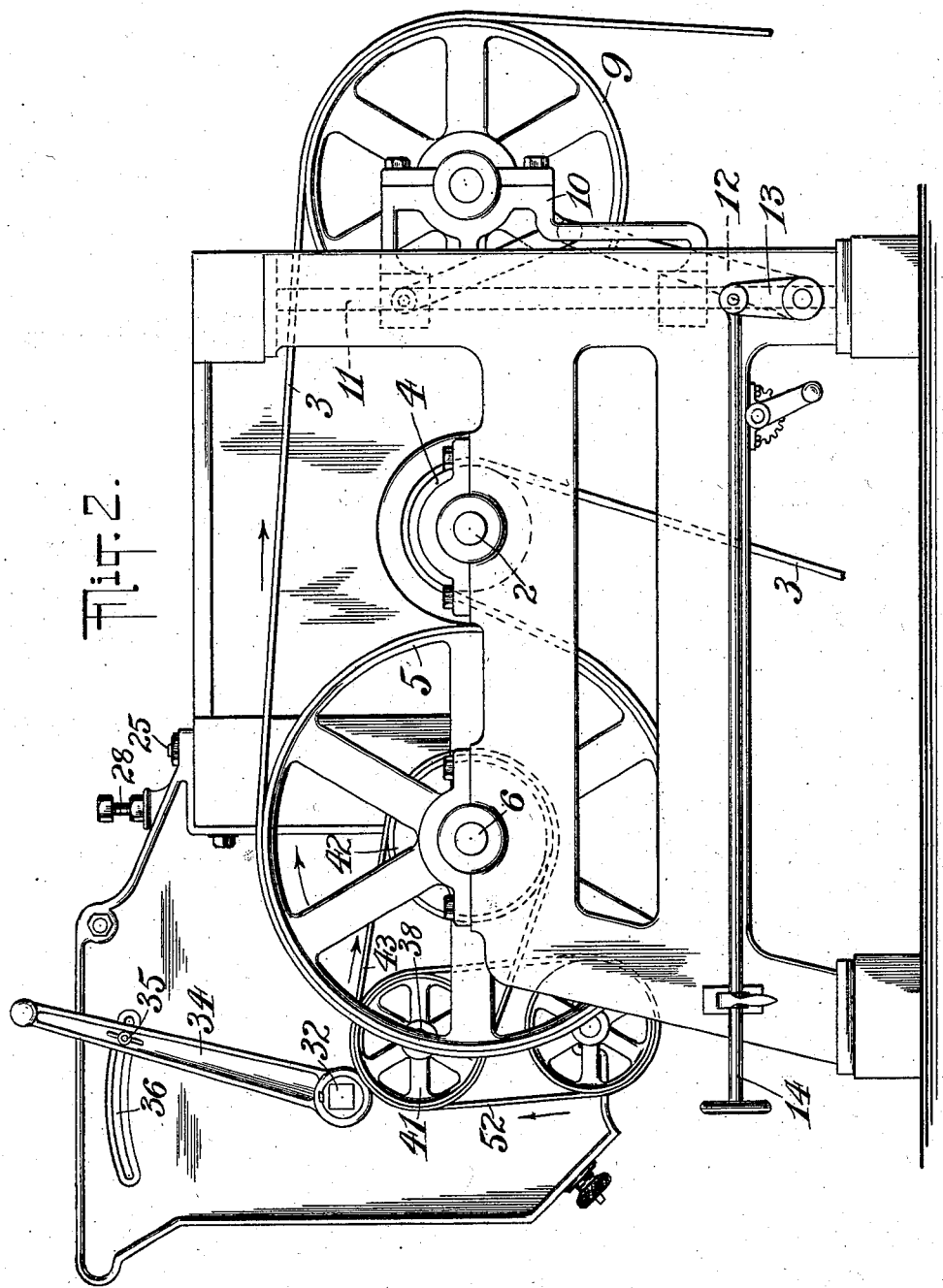

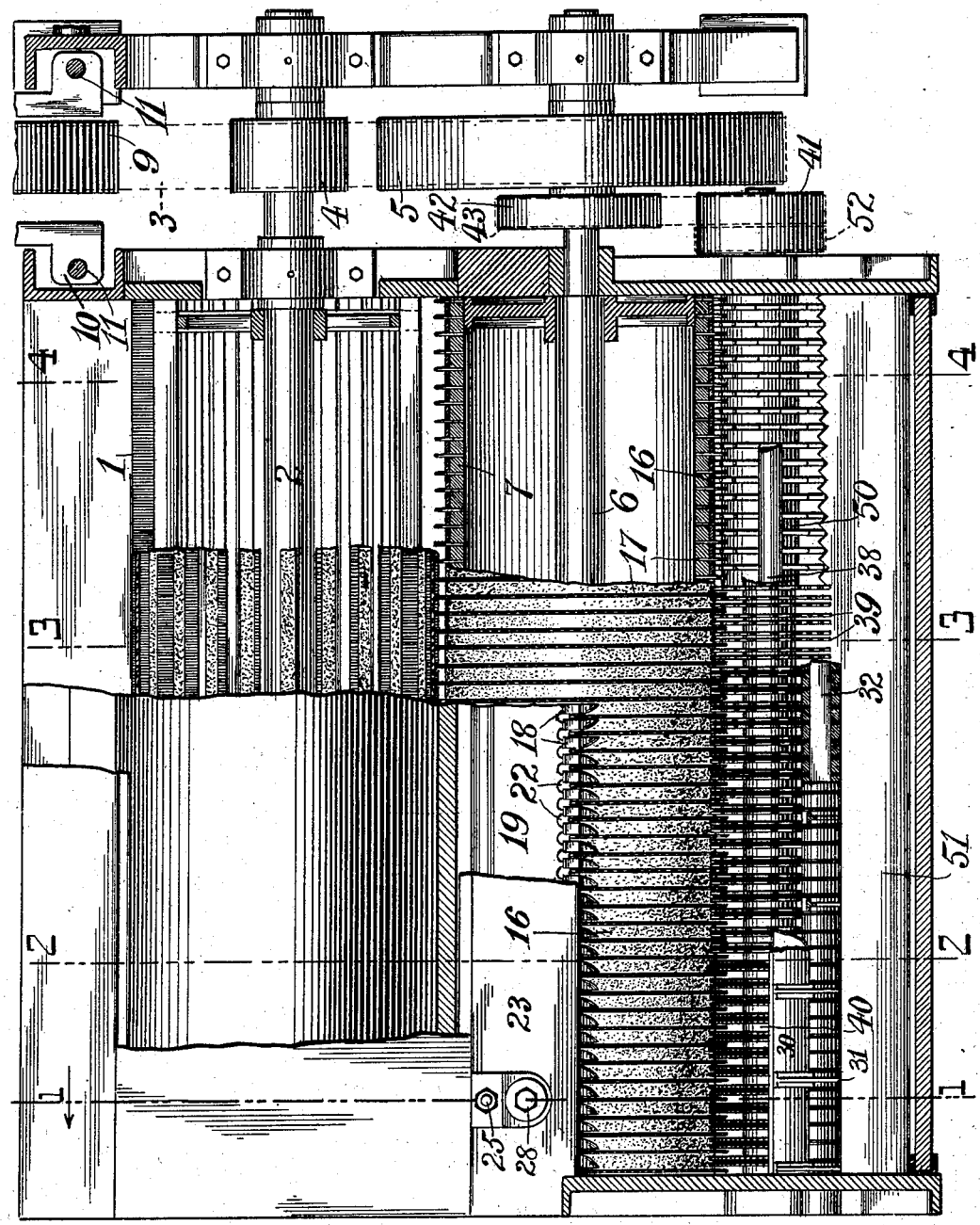

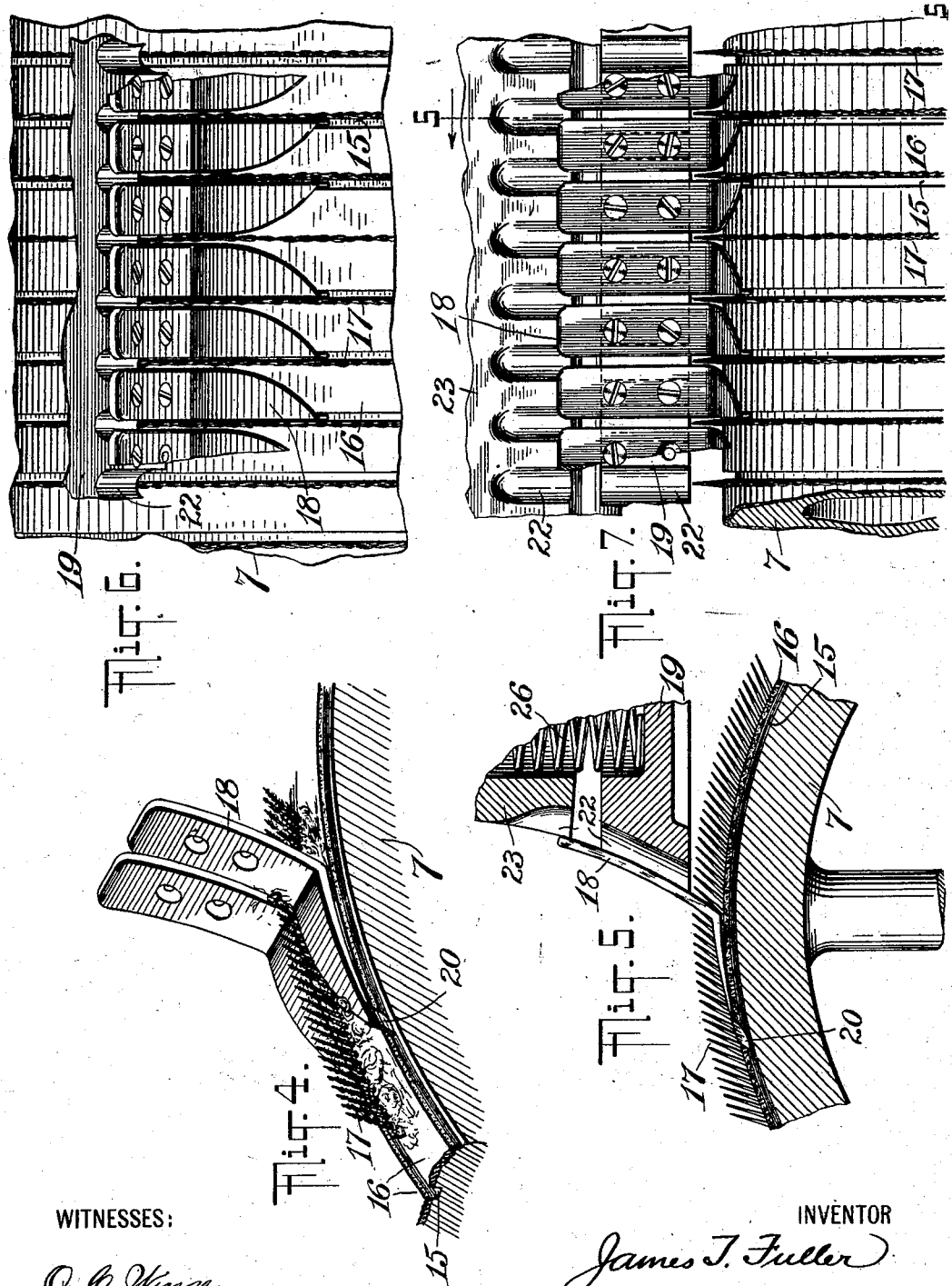

JAMES T. FULLER, OF CALVERT, TEXAS.

COTTON-GIN.

SPECIFICATION forming part of Letters Patent No. 707,096, dated August 19, 1902.

Application filed August 24, 1901. Serial No. 73,117. (No model.)

*To all whom it may concern:*

Be it known that I, JAMES T. FULLER, a citizen of the United States, and a resident of Calvert, Robertson county, Texas, have invented certain new and useful Improvements in Cotton-Gins, of which the following is a full, clear, and exact description, reference being had to the accompanying drawings, forming part of this specification.
The object of my invention is the embodiment in a gin of the advantages pertaining to both the saw and roller types—that is to say, of the relatively large ginning capacity of the former with the preservation of the fiber due to the employment of the latter type; and it consists in the novel structural features and combinations hereinafter described and claimed.

In the accompanying drawings, Figure 1 is a sectional elevation on the line 1 1, Fig. 3. Fig. 2 is a side elevation. Fig. 3 is a plan view on different horizontal planes 2 2 3 3 4 4, as shown in Fig. 1. Fig. 4 is a detail in perspective, showing the ginning points and fingers. Fig. 5 is a sectional view thereof and of the finger-bar. Fig. 6 is a plan thereof. Fig. 7 is an elevation thereof, and Fig. 8 is a detail of the huller disks and hooks.

Similar reference characters are employed to designate corresponding parts in all the views.

In the particular embodiment of my invention which I have selected for purposes of description and which to that end I have illustrated in the drawings the brush 1 is of the ordinary open construction and is mounted on the shaft 2. It is driven by the belt 3, which passes over the brush-pulley 4, Fig. 2, and around the pulley 5, carried by the shaft 6 of the ginning-cylinder 7, the direction of rotation of the brush and ginning-cylinder being shown by arrows, Fig. 1. Provision is made for starting and stopping the gin by the employment of an idler-pulley 9, Fig. 2, over which the belt passes, and which is mounted in a carriage 10, movable vertically on the guide-rods 11, carried by the frame of the gin. A toggle 12 is connected with the carriage 10 and is swung in and out to raise or lower the carriage 10 and pulley 9 by the crank 13 and its operating-rod 14.

As shown in the drawings, the cylinder 7, which is usually made of cast metal and mounted in journals in the usual manner and which for convenience I have termed a "ginning-cylinder," is preferably formed with a series of circumferential grooves 15, and in the construction illustrated the spaces between the grooves are covered with strips of leather 16 or other relatively flexible or yielding material, which are stretched and secured tightly over the surface of the cylinder. It is of course obvious that any equivalent material affording the proper frictional engagement with the cotton may be employed in place of leather. Upon the surface of the cylinder are arranged a plurality of spaced circumferential rows of ginning-points 17, which in the form shown are smooth tapering pins, and they are preferably set obliquely to the surface of the cylinder, so as to incline toward the direction of its rotation. When the cylinder is constructed with the grooves 15, the pins 17 are usually located close to the edges of the grooves. Between each adjacent two rows of pins is a stripping-finger 18, carried by the adjustable finger-bar 19. Each finger comprises a body portion, which is secured to the bar and extends upward obliquely to the surface of the ginning-cylinder and approximately parallel to the pins 17, so as to constitute a slotted section in the rear wall of the inner breast of the gin. Each finger also comprises a bladelike end portion, which projects forwardly over and conforms approximately to the surface of the cylinder. The body portion of each finger 18 is, as illustrated, slightly curved to approximate the contour of the inner breast, while the end portion is reversely curved to conform approximately to the surface of the cylinder. Preferably the fingers are shaped as shown in the drawings, one side being straight, while the other side is projected on a curve which intersects the straight side and forms an end more or less pointed, where a downwardly-projecting lip 20 is formed, which enters the corresponding groove 15 of the ginning-cylinder. The object of the lips 20 and grooves 15 is to prevent the accumulation of cotton on the points of the fingers. For the purpose of balancing the longitudinal thrust on the ginning-cylinder the curved sides of the fingers over one half of the cylinder are arranged to face the curved sides of the fingers over the other half, as shown in Figs. 3, 6, and 7. The finger-bar 19 is formed with a series of grooves or recesses 22, one of which lies behind the slot formed between the edges of each pair of fingers, and corresponding recesses are formed in the breast-beam 23, extending above the tops of the fingers, so that any cotton which may pass partially but not entirely through the slots between the fingers will by the movement of the unginned cotton therein be carried freely up into the inner breast of the gin, and thus prevent any clogging of the slots.

The finger-bar 19 is secured to the breast-beam 23 by the bolt 25, and a hemispherical rib on the beam engages with a groove on the bar 19, so as to form a universal bearing at that point to permit the accurate vertical and horizontal adjustments of the bar 19 and fingers 18 relative to the pins 17 and to the surface of the cylinder. A coil-spring 26 is centered in recesses formed in the bar and the beam. The upper end of this spring bears against a follower 27, which is engaged by the lower end of the adjusting-screw 28. The bar 19 is normally so adjusted that the projecting ends of the fingers 18 contact with the outer surface of the ginning-cylinder, the heel portion of the fingers being slightly higher, as shown most clearly in Fig. 5. When in this position, the bar 19 is clamped in place by tightening the bolt 25, and the screw 28 is then turned to compress the spring 26 to secure proper relative adjustment of the fingers with the surface of the ginning-cylinder.

The inner breast-board 30 is secured to arms 31, which are rigidly secured to the shaft 32, and the hand-lever 34, Fig. 2, is also secured to said shaft outside the frame for turning the shaft to swing the breast-board and open the inner breast. By means of the clamping-screw 35, which works in the slot 36 in the side frame of the gin, the lever 34 may be clamped in different positions.

Upon the shaft 38 are secured a series of flat disks 39, which, as shown, have preferably, but not necessarily, scalloped edges. The disks are arranged on the shaft 38 in pairs and are separated by the hubs 40. The ginning points or pins 17 project slightly beyond the edges of the disks between each pair. The shaft 38 and disks 39 are rotated in the same direction as the ginning-cylinder by a pulley 41, which is connected with a pulley 42 on the ginning-cylinder shaft by the belt 43.

Upon the shaft 32, which carries the inner breast-board, are secured a series of plates 45, each of which is provided with the hook-like projections 46 and with the arm 47. One of these plates 45 is in the construction illustrated arranged between each two of the disks 39, which form a pair. When the shaft 32 is turned by the lever 34 to open the inner breast, the arms 47 will engage the hubs 40 and limit the outward movement of the breast-board, and at the same time the hooks 46 will engage the cotton which fills the inner breast and lift it above the disks 39 and partially above the pins 17.

A huller-roller 50 is arranged at the bottom of the outer breast, and an adjustable seed-plate 51 is secured to the outer breast-board. The huller-roller is driven by the belt 52 from the pulley 41.

In the foregoing description of an operative and preferable form of apparatus embodying my invention I have for clearness and convenience of description mentioned certain features and referred to certain forms and arrangements of some of the parts employed, but I have done this without any intention of limiting my invention or restricting the scope of my claims therefor, since various other equivalent arrangements and constructions can obviously be employed without in any sense departing from the spirit of my invention. For instance, I have described and illustrated the ginning-cylinder as provided with grooves and having the spaces between the grooves covered with some yielding material like leather; but it is apparent that some of the other features herein claimed may be made use of without adopting this particular construction.

The operation of my improved gin needs but little further description. The cotton is fed into the outer breast in the usual manner and is by the huller-roller 50 thrown against the ginning-cylinder and is engaged by the points 17. The hulls and trash are stopped by the revolving disks 39 and drop back and are thrown out by the huller-roller. The cotton is carried up by the points 17 between the disks 39 and is engaged by the curved sides of the ends of the fingers 18, a portion of the lint being drawn under the sides of the fingers. The seeds that are not separated from the lint by contact with the ends of the fingers and by the action of the pins which carry the seeds against their sides are carried along with the cotton, but are caught by the body portions of the fingers, the lint being drawn through the slots by the pins. The lint that is partially but not entirely separated from the seeds, but which passes through the slots between the fingers, is carried up the fingers through the recesses 22 by the revolving mass or roll of cotton in the inner breast, with which it is partially entangled, and is drawn into the breast and becomes a part of the roll, which is carried around therein and again presented to the action of the pins. The movement of the cotton in the inner breast is contributed to by the action of the disks 39, which in revolving act continuously to carry the cotton into contact with the ginning-points until the cotton is lifted out of engagement with the disks by the plates 45. The seeds that have been separated from the lint are also carried around the breast by the rotary movement of this roll and falling down between the disks 39 and the pins 17 are thrown out of the gin by the huller-roller 50. The lint that has been entirely freed from the seeds is carried along under and between the fingers 18 and is removed from the ginning-cylinder by the action of the brush 1 and is carried to the gin-flue in the usual manner. When it is desired to arrest the ginning action without stopping the gin, the inner breast-board is thrown out and the hooks 46 engage the revolving roll of unginned cotton, lifting it above the disks 39 and partially above the pins 17. The hooks will arrest the rotation of the roll and the pins, quickly carrying off the cotton on the lower surface thereof. An arch will be formed almost immediately over the top of the pins and the ginning will entirely cease, but will recommence at once upon the lowering of the hooks 46.

Having thus described my invention, what I claim as new, and desire to secure by Letters Patent, is—

1. In a cotton-gin, a ginning-cylinder provided with ginning-points arranged in circumferential rows, in combination with stripping-fingers provided with blade-like end portions which project circumferentially over the surface of the cylinder between the rows of ginning-points below the ends thereof.

2. In a cotton-gin, a ginning-cylinder carrying circumferential rows of ginning-points, in combination with spaced stripping-fingers having blade-like end portions which project over the surface of the cylinder between the rows of ginning-points and extend upwardly above the points to form a slotted wall for the inner breast.

3. A stripping-finger for cotton-gins having a blade-like end portion shaped to extend circumferentially over the surface of the ginning-cylinder, and a body portion arranged at an angle to the end portion.

4. A stripping-finger for cotton-gins having a pointed end portion shaped to extend circumferentially over the surface of the ginning-cylinder, and a body portion arranged at an angle to the end portion.

5. In a cotton-gin, the combination of a ginning-cylinder provided with circumferential rows of independent pin-like ginning-points, and stripping-fingers having a blade-like end portion shaped to extend circumferentially over the surface of the cylinder and a body portion extending upwardly above the points to form a slotted wall for the inner breast.

6. In a cotton-gin, the combination of a ginning-cylinder provided with circumferential rows of independent pin-like ginning-points in combination with stripping-fingers provided with blade-like end portions which project circumferentially over the surface of the cylinder between the rows of ginning-points and below their apices, substantially as shown and described.

7. A stripping-finger for cotton-gins having an end portion shaped to extend circumferentially over the surface of the ginning-cylinder and carrying at its extremity a downwardly-projecting lip.

8. A stripping-finger having a pointed end portion shaped to extend circumferentially over the surface of the ginning-cylinder and carrying at its point a downwardly-projecting lip.

9. In a cotton-gin, the combination of a ginning-cylinder provided with circumferential grooves, a row of ginning-points between the grooves, stripping-fingers having an end portion which projects circumferentially over the surface of the cylinder between the ginning-points, and lips carried by the stripping-fingers and extending into said grooves.

10. In a cotton-gin, the combination of a ginning-cylinder provided with ginning-points arranged in circumferential rows, a surface of relatively yielding material between the ginning-points and stripping-fingers having end portions which project over such surface.

11. In a cotton-gin, the combination of a ginning-cylinder provided with ginning-points arranged in circumferential rows, a surface of relatively yielding material between the ginning-points and stripping-fingers having end portions which project over said surface and body portions arranged at an angle to the end portions and spaced to form a slotted wall for the inner breast.

12. In a cotton-gin, the combination of a ginning-cylinder provided with ginning-points arranged in circumferential rows, strips of relatively yielding material, of less width than the distance between the rows of ginning-points, secured to the cylinder between the rows, stripping-fingers extending over said strips and downwardly-projecting lips carried by said fingers at the sides of said strips.

13. In a cotton-gin, a ginning-cylinder provided with ginning-points arranged in circumferential rows, in combination with stripping-fingers provided with end portions which project circumferentially over the surface of the cylinder between the rows of ginning-points, below the ends thereof, and an adjustable bar to which said fingers are secured.

14. In a gin, the combination of a ginning-cylinder provided with ginning-points arranged in circumferential rows, stripping-fingers projecting between the rows, a bar to which said fingers are secured and means for adjusting the position of said bar vertically and longitudinally.

15. In a gin the combination of a ginning-cylinder provided with ginning-points arranged in circumferential rows, stripping-fingers projecting between the rows, a bar to which said fingers are secured and means for adjusting the position of said bar, comprising an adjusting-screw and a spring interposed between the screw and said bar.

16. In a gin the combination with a ginning-cylinder having ginning-points arranged thereon in circumferential rows, of a plurality of revoluble disks, coöperating with the ginning-points, and means for presenting the cotton to the action of the ginning-points below said disks.

17. In a gin the combination with the ginning-points and means coöperating therewith to separate the lint from the seed, of a plurality of revoluble disks arranged below the inner breast adjacent to the ginning-cylinder, and means for presenting the cotton to the action of the ginning-points below said disks.

18. In a gin the combination with the ginning-points and means coöperating therewith to separate the lint from the seed, of a plurality of revoluble disks having scalloped edges arranged below the inner breast adjacent to the ginning-cylinder.

19. In a gin the combination with a ginning-cylinder having ginning-points arranged thereon in circumferential rows, of a plurality of revoluble disks having scalloped edges which project between said rows.

20. In a gin, the combination with a ginning-cylinder having ginning-points arranged thereon in circumferential rows, of a plurality of revoluble disks, arranged in pairs, the edges of which project between said rows, and means for presenting the cotton to the action of the ginning-points below said disks.

21. In a gin the combination with a ginning-cylinder having ginning-points arranged thereon in circumferential rows, of a plurality of revoluble disks coöperating therewith, plates arranged between said disks and means for actuating said plates to engage the cotton in the gin-breast and lift it above said disks.

22. In a gin the combination with a ginning-cylinder having ginning-points arranged thereon in circumferential rows, of a plurality of revoluble disks which project between said rows, plates arranged between said disks and having projections for engaging the cotton in the gin-breast and means for moving said projections above the edges of the disks.

23. In a gin the combination with a ginning-cylinder having ginning-points arranged thereon in circumferential rows of a plurality of revoluble disks which project between said rows and means for lifting the cotton in the gin-breast clear of the disks.

24. In a gin the combination with the ginning-points and means coöperating therewith to separate the seed from the lint, of means for lifting the cotton relatively to the ginning-points and retarding its rotation in the breast to arrest the ginning action without stopping the gin.

25. In a gin the combination with the ginning-points and means coöperating therewith to separate the seed from the lint, of plates at the lower portion of the inner breast and means for lifting said plates to engage the cotton in the breast for the purposes set forth.

26. In a gin the combination with the ginning-points and means coöperating therewith to separate the seed from the lint, of means for engaging the cotton in the inner breast and carrying it to the ginning-points and means for retarding the movement of the cotton in the inner breast without stopping the gin.

27. In a gin the combination with the ginning-points and means coöperating therewith to effect the separation of the seed from the lint, of revolving devices for engaging the cotton in the inner breast and carrying it to the ginning-points and means for effecting the disengagement of such cotton and said devices.

28. In a gin the combination with the ginning-points and means coöperating therewith to effect the separation of the seed from the lint, of revolving devices for engaging the cotton in the inner breast and carrying it to the ginning-points and means for lifting the cotton out of engagement with said devices.

JAMES T. FULLER.

Witnesses:
S. G. METCALF,
THOS. BLOOMFIELD, Jr.